(12) United States Patent
Muramatsu et al.

(10) Patent No.: US 9,027,955 B2
(45) Date of Patent: May 12, 2015

(54) COVER MEMBER OF AIRBAG DEVICE

(71) Applicant: Nihon Plast Co., Ltd., Fujinomiya-shi, Shizuoka (JP)

(72) Inventors: Katsuya Muramatsu, Fujinomiya (JP); Tomohiro Sakurai, Fujinomiya (JP)

(73) Assignee: Nihon Plast Co., Ltd., Shizuoka (JP)

( * ) Notice: Subject to any disclaimer, the term of this patent is extended or adjusted under 35 U.S.C. 154(b) by 11 days.

(21) Appl. No.: 13/840,013

(22) Filed: Mar. 15, 2013

(65) Prior Publication Data

US 2013/0285355 A1   Oct. 31, 2013

(30) Foreign Application Priority Data

Apr. 27, 2012   (JP) ................................ 2012-104110

(51) Int. Cl.
  *B60R 21/215*   (2011.01)
  *B60R 21/2165*   (2011.01)

(52) U.S. Cl.
  CPC ........... *B60R 21/2165* (2013.01); *B60R 21/215* (2013.01); *B60R 2021/21543* (2013.01)

(58) Field of Classification Search
  USPC ............. 280/728.1, 728.2, 728.3, 731, 743.1; 40/662, 663, 668
  See application file for complete search history.

(56) References Cited

U.S. PATENT DOCUMENTS

| | | | | |
|---|---|---|---|---|
| 5,678,851 A | * | 10/1997 | Saito et al. ................. | 280/728.3 |
| 5,685,056 A | * | 11/1997 | Fischer ........................... | 29/512 |
| 5,775,721 A | * | 7/1998 | Grout ........................... | 280/727 |
| 5,851,022 A | * | 12/1998 | Yamamoto et al. ........ | 280/728.3 |
| 6,443,484 B2 | * | 9/2002 | Anglsperger ............... | 280/728.3 |
| 6,546,659 B1 | * | 4/2003 | Imai et al. ........................ | 40/662 |
| 6,581,311 B1 | * | 6/2003 | Davey et al. .................... | 40/593 |
| 7,172,210 B2 | * | 2/2007 | Yokota et al. ............... | 280/728.2 |
| 7,520,528 B2 | * | 4/2009 | Nakamura et al. ............ | 280/731 |
| 7,766,371 B2 | * | 8/2010 | Fujimori et al. ........... | 280/728.3 |
| 7,775,550 B2 | * | 8/2010 | Dominguez Aparicio et al. .......................... | 280/728.3 |
| 8,061,861 B2 | * | 11/2011 | Paxton et al. ................... | 362/84 |
| 2003/0151235 A1 | * | 8/2003 | Hohne et al. ................. | 280/731 |

(Continued)

FOREIGN PATENT DOCUMENTS

| JP | 10-100833 A | 4/1998 |
|---|---|---|
| JP | 2000-255361 A | 9/2000 |

(Continued)

OTHER PUBLICATIONS

GB Search Report issued Aug. 30, 2013, in counterpart GB Patent Application No. 1305373.1 (1 pg).

*Primary Examiner* — Paul N Dickson
*Assistant Examiner* — Barry Gooden, Jr.
(74) *Attorney, Agent, or Firm* — Arent Fox LLP

(57) ABSTRACT

First support portions 71 and 72 positioned on a predetermined straight line L2 approximately perpendicular to a broken line of a hinge portion is set in a support portion 70 that supports a back plate 27 with respect to a back face side of a door portion 36. Second and third support portions 73 and 74 positioned in line symmetry with respect to the straight line L2, are set in the support portion 70. It is possible to receive the centrifugal force, which is applied to the back plate 27 due to the expansion of the door portion 36, with good balance by the first to third support portions 71, 72, 73, and 74. An emblem 24 can be reliably fixed to the door portion 36 with preventing a fixing pin 31 from being excessively locked into a through hole 33 more than necessary.

3 Claims, 6 Drawing Sheets

(56) References Cited

U.S. PATENT DOCUMENTS

| | | |
|---|---|---|
| 2005/0067815 A1 | 3/2005 | Dearden et al. |
| 2005/0079305 A1* | 4/2005 | Krappmann ................ 428/35.7 |
| 2009/0315306 A1* | 12/2009 | Worrell et al. ................ 280/731 |
| 2014/0145419 A1* | 5/2014 | Ishikawa et al. ........... 280/728.3 |
| 2014/0210191 A1* | 7/2014 | Bosch et al. ............... 280/728.3 |

FOREIGN PATENT DOCUMENTS

| | | |
|---|---|---|
| JP | 2009-166780 A | 7/2009 |
| JP | 2012-086697 A | 5/2012 |

* cited by examiner (a)

(b)

(a)

(b)

COVER MEMBER OF AIRBAG DEVICE

CROSS REFERENCE TO RELATED APPLICATIONS

This application claims priority of Japanese Patent Application No. 2012-104110 filed on Apr. 27, 2012. The contents of this application are incorporated herein by reference in their entirety.

BACKGROUND OF THE INVENTION

1. Field of the Invention

The present invention relates to a cover member of an airbag device in which a plurality of door portions cleaved at the time of inflation and expansion of an airbag are segmented in a cover body covering the airbag.

2. Description of the Related Art

Conventionally, there has been used an airbag device provided in a fixed portion of a steering wheel of a vehicle such as an automobile. Such an airbag device includes an airbag substantially shaped like a bag, an inflator for supplying gas to the airbag, and a cover member for covering and accommodating the airbag at the time of non-expansion. In the cover member, a cover body covering the airbag accommodated in a retracted state is formed with a tear line (a breaking scheduled portion) that is easily broken. For example, configuration is such that when a vehicle receives an impact due to a collision or the like, gas is supplied to the airbag from the inflator to inflate the airbag, the cover body of the cover member is broken along the tear line due to the inflation of the airbag to form a plurality of door portions, and the door portions are expanded about hinge portions, so that the airbag is expanded toward an occupant side and thus an occupant is constrained and protected.

For such a cover member of an airbag device, there has been known a configuration in which an emblem (an ornament) as an ornamental member is mounted on approximately the center of the cover member and a tear line is disposed along the emblem. In this configuration, a fixing pin protruding from a back side of an emblem body disposed at a surface side of a cover body is inserted through the cover body, and a locking portion protruding from the tip end of the fixing pin is fitted into and locked into a through hole as a lock receiving portion provided to a mounting member disposed at a back side of the cover body, so that the cover body is sandwiched between the emblem body and the mounting member and the emblem is fixed (for example, refer to Japanese Laid-open Patent Application No. 2000-255361 (pages 3 and 4 and FIGS. 1 to 3)).

Since the door portion mounted with the emblem is heavier than a door portion having no emblem, the start of expansion behavior may be delayed. Furthermore, if the expansion starts once, the door portion has a tendency to move in the same direction due to large inertia. Therefore, the shape of the door portion mounted with the emblem is allowed to be different from that of the door portion having no emblem and the area of the door portion mounted with the emblem is allowed to be larger than that of the door portion having no emblem, so that the door portion mounted with the emblem is more largely affected by force when an airbag is expanded as compared with the other door portions, and is expanded with good balance without delay with respect to other door portions (for example, refer to Japanese Laid-open Patent Application No. 2009-166780 (pages 4 and 5 and FIG. 1)).

However, since the locking portion of the fixing pin is firmly fitted into the through hole in order to allow the emblem to be reliably held in the door portion against the centrifugal force applied at the time of expansion of the door portion, workability at the time of the fitting may deteriorate and productivity and manufacturability may deteriorate.

SUMMARY OF THE INVENTION

The present invention has been made to solve the conventional problem described above, and it is an object of the present invention to provide a cover member of an airbag device, by which it is possible to improve productivity and manufacturability while allowing an ornamental member to be reliably fixed to a door portion.

A cover member of an airbag device according to first aspect of the present invention, comprising:

a cover body that covers an accommodated airbag;

a tear line that segments the cover body, and is cleaved to form a plurality of door portions when the airbag is inflated and expanded;

a plurality of hinge portions disposed along an outer edge of the cover body and allowing expansion of the door portions;

an ornamental member provided with an ornamental body positioned at a surface side of one of the door portions, a mounting member positioned at a back face side of the door portion, separately from the ornamental body, a fixing pin protruding from one of the ornamental body and the mounting member and inserted through the door portion, and a lock receiving portion that is provided at the other of the ornamental body and the mounting member and locks the fixing pin inserted through the door portion to fix the ornamental body to the door portion; and a support portion protruding from one of the mounting member and the back face side of the door portion and supporting the mounting member with respect to the back face side of the door portion, wherein the support portion comprises:

a first support portion positioned on a predetermined straight line approximately perpendicular to a broken line of the hinge portion that allows the expansion of the door portion mounted with the ornamental member; and second and third support portions positioned in line symmetry with respect to the predetermined straight line.

The cover member of an airbag device according to second aspect of the present invention, wherein in the first aspect, the cover body is formed of synthetic resin, the support portion protrudes from the back face side of the door portion, and at least one of the first support portion, the second support portion, and the third support portion of the support portion has a cylindrical shape formed therein with a recess.

The cover member of an airbag device according to third aspect of the present invention, in the first aspect or the second aspect, comprising:

a protrusion that protrudes from the back face side of the door portion mounted with the ornamental member and surrounds periphery of the mounting member of the ornamental member.

The cover member of an airbag device according to fourth aspect of the present invention, in the first to the third aspect, comprising:

a fitting portion that is recessed in the surface side of the door portion mounted with the ornamental member and fits the ornamental body of the ornamental member.

According to the first aspect of the present invention, the first support portion, which is positioned on a predetermined straight line approximately perpendicular to a broken line of a hinge portion, and the second and third support portions, which are positioned in line symmetry with respect to the predetermined straight line, are set in the support portion that supports the mounting member with respect to the back face side of the door portion, so that it is possible to receive the centrifugal force, which is applied to the mounting member due to the expansion of the door portion, with good balance by the first to third support portions. Consequently, the ornamental member can be reliably fixed to the door portion with preventing the fixing pin from being excessively locked into the lock receiving portion more than necessary, so that it is possible to improve locking workability of the lock receiving portion and the fixing pin, resulting in the improvement of productivity and manufacturability.

According to the second aspect of the present invention, in addition to the effect of the cover member of the airbag device of the first aspect, at least one of the first to third support portions of the support portion protruding from the back face side of the door portion has a cylindrical shape having the recess therein, so that when the cover body is formed of synthetic resin, a sink mark is difficult to occur in the surface side of the door portion of the cover body, resulting in the further improvement of an external appearance.

According to the third aspect of the present invention, in addition to the effect of the cover member of an airbag device of the first aspect or the second aspect, the periphery of the mounting member is surrounded by the protrusion protruding from the back face side of the door portion, so that the mounting member can be held at the fixed position of the door portion more reliably with respect to the centrifugal force applied when the door portion is expanded.

According to the fourth aspect of the present invention, in addition to the effect of the cover member of an airbag device of one of the first to third aspects, the ornamental body is fitted into the fitting portion recessed in the surface side of the door portion, so that the ornamental body can be held at the fixed position of the door portion more reliably with respect to the centrifugal force applied when the door portion is expanded. Furthermore, since it is possible to suppress the protruding of the ornamental body to the surface side of the door portion, an occupant does not feel discomfort even though a hand of the occupant touched in a steering wheel operation.

BRIEF DESCRIPTION OF THE DRAWINGS

FIG. 1 shows a first embodiment of a cover member of an airbag device of the present invention, wherein FIG. 1(a) is a diagram showing a back face of a part of a door portion of a cover body and FIG. 1(b) is a sectional view of a part of FIG. 1(a);

FIG. 2 is a front view showing an ornamental member of the cover member of the first embodiment, wherein FIG. 2(a) shows an ornamental body and FIG. 2(b) shows a mounting member;

DESCRIPTION OF THE PREFERRED EMBODIMENTS

Figure 1:
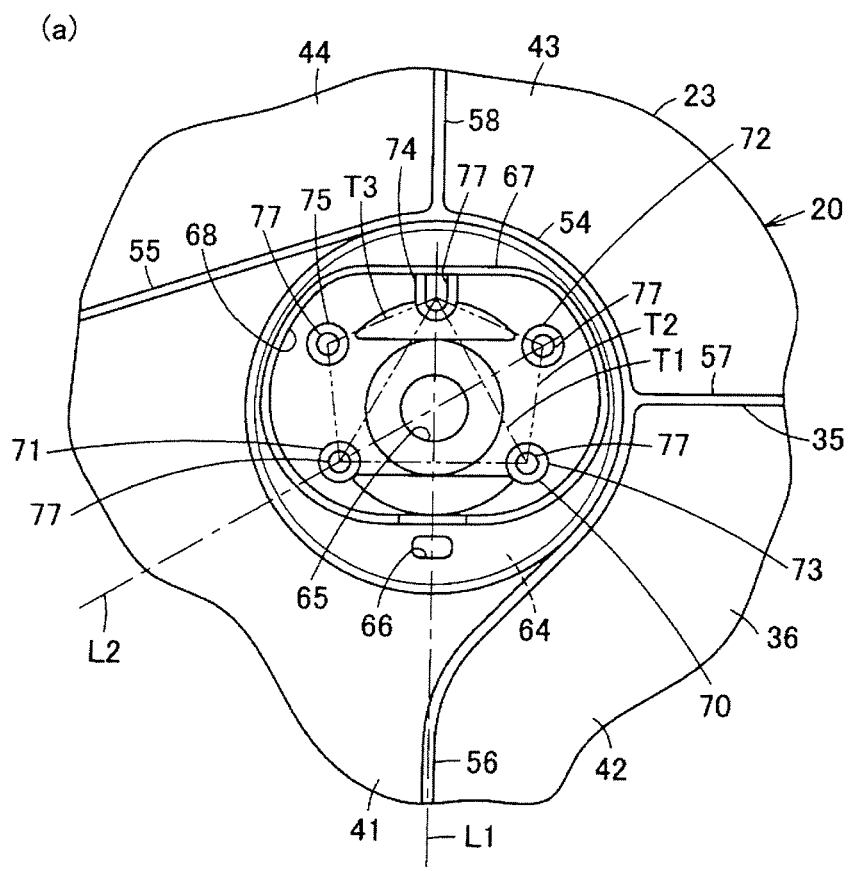
Figure 1:
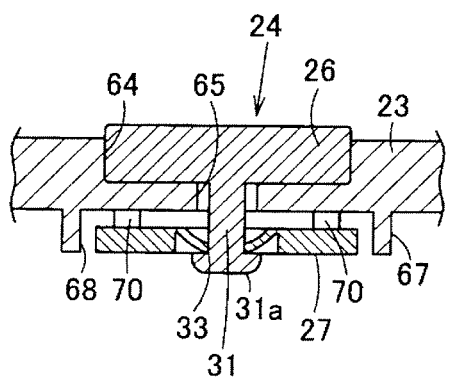
Figure 2:
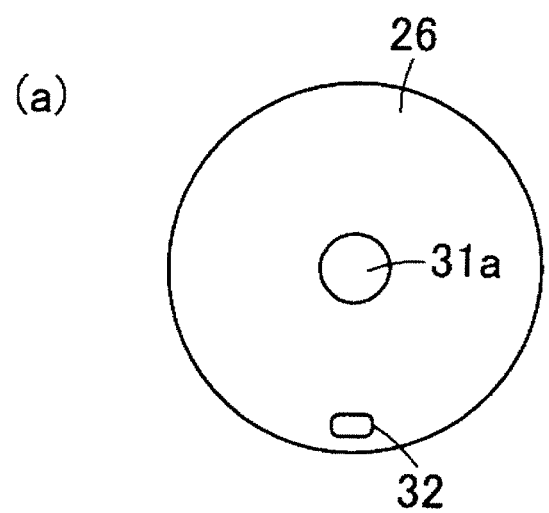
Figure 2:
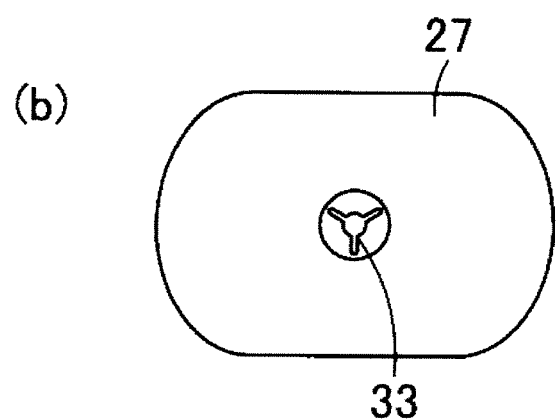
Figure 3:
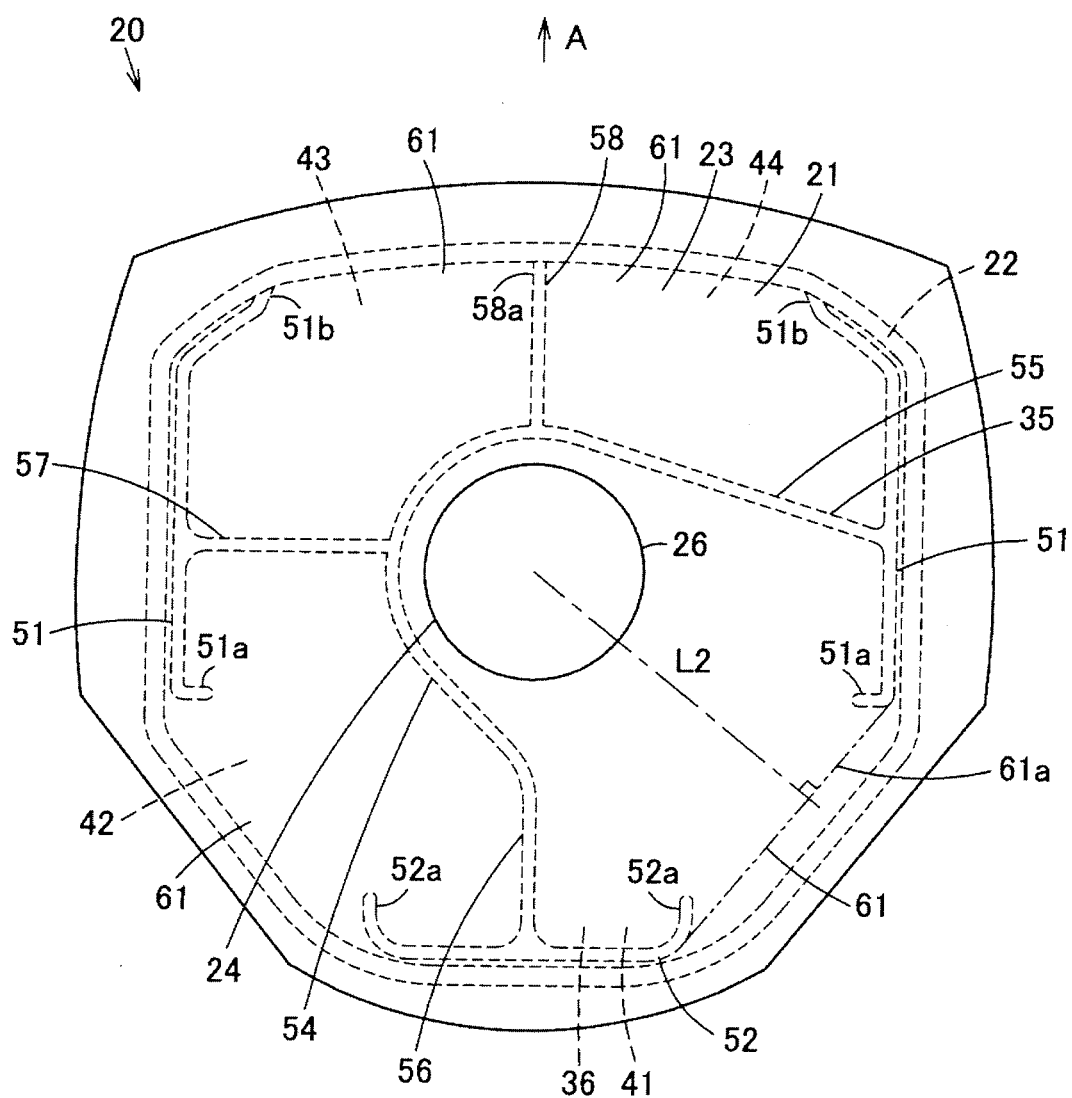
FIG. 3 is a front view showing the cover member of the first embodiment.

Hereinafter, a first embodiment of a cover member of an airbag device, according to the present invention, will be described referring to the drawings.

Figure 4:
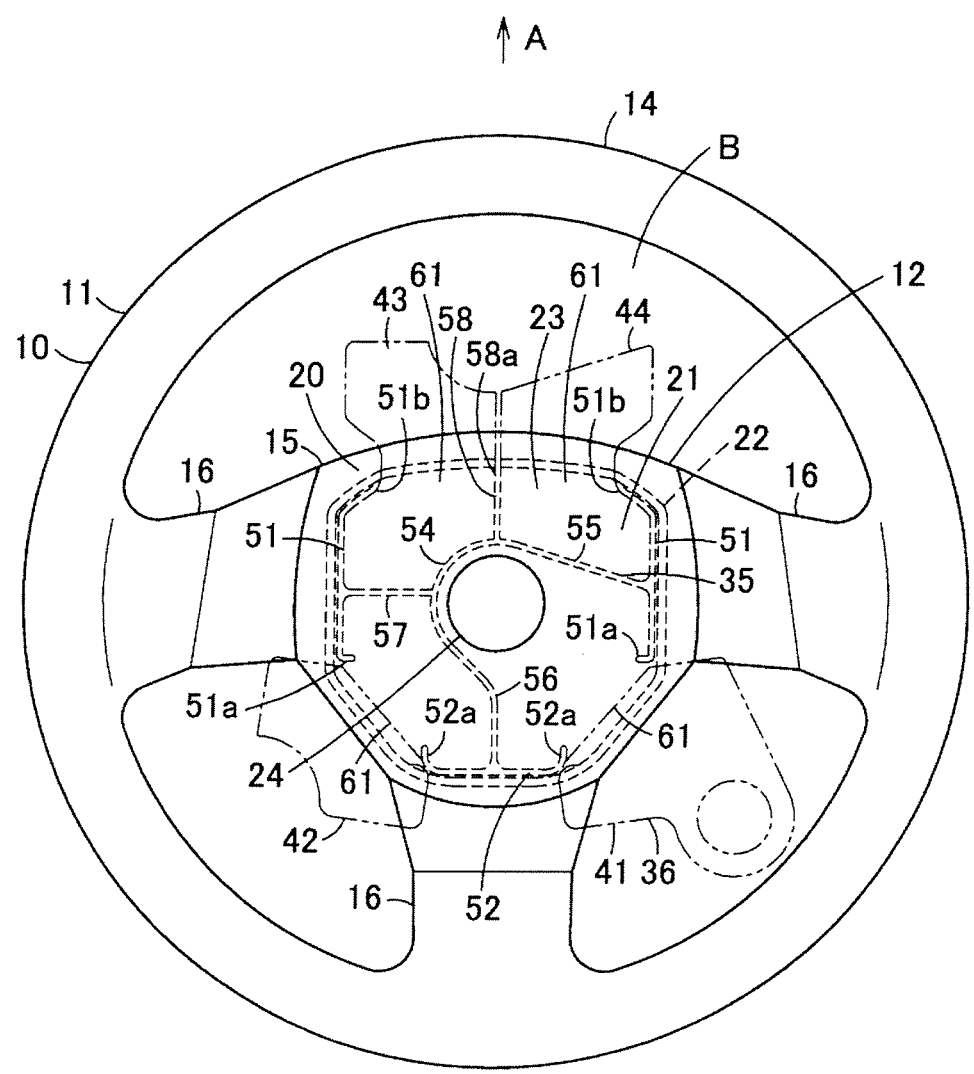
FIG. 4 is a front view of a steering wheel including the airbag device provided with the cover member of the first embodiment.

In FIG. 4, reference numeral 10 designates a steering wheel of an automobile (a vehicle). The steering wheel 10 includes a steering wheel body 11 and an airbag device 12 mounted on an occupant side of the steering wheel body 11. In addition, the steering wheel 10 is mounted on a steering shaft provided to a vehicle normally in an inclined state. However, it is noted that the following description will be provided with setting a straight-ahead state of a vehicle as a reference, setting a steering shaft side as a rear side, setting an occupant side as a front side, and setting a direction (a direction indicated by an arrow A) toward a front glass as an upper side.

The steering wheel body 11 includes a rim portion 14, which is a ring-like grip portion, a boss portion 15 positioned inside of the rim portion 14, and a plurality of spoke portions 16 (three spoke portions 16 in the present embodiment) for linking the rim portion 14 to the boss portion 15. In order to ensure high visibility for meters provided in an installment panel, the three spoke portions 16 are disposed at both sides and a lower side of the boss portion 15 in a straight-ahead state, and at an upper side of the boss portion 15, a relatively large opening B for meter visibility is ensured.

Although not shown in the drawings, the boss portion 15 is provided on the rear face thereof with an approximate cylindrical boss fitted to the steering shaft, and a boss plate constituting a core body is integrally fixed to the boss by insert-casting a magnesium alloy or the like with a die-cast. Then, from the boss plate, a cored bar of the spoke portion 16 integrally extends, or is firmly fixed through welding or the like. Moreover, a cored bar of the rim portion 14 is firmly fixed to the cored bar of the spoke portion 16 through welding or the like. Furthermore, a surface portion including soft foamed polyurethane or the like is formed at an outer peripheral portion of the cored bar of the rim portion 14 and an outer peripheral portion of a part at the rim portion 14 side of the cored bar of the spoke portion 16, and further, all or a part of an outer periphery of the surface portion is covered by natural or artificial leather.

Meanwhile, since the airbag device 12 is also called as an airbag module and is disposed to cover a front side of the boss portion of the steering wheel body 11, the airbag device 12 includes a base plate as a mounted member including a metal plate or the like, an airbag substantially shaped like a bag, an inflator for injecting gas, or the like, and includes a cover member 20 made of resin shown in FIG. 1 to FIG. 4. The base plate is mounted on the steering wheel body 11 via a horn plate or a bracket portion, the airbag, the inflator, and the cover member 20 are mounted on the base plate, and a slightly retracted airbag is covered by the cover member 20.

Since the cover member 20 is also called as a case member, a pad, or a module cover, a surface plate portion 21 and a peripheral plate portion 22 are integrally formed with each other using synthetic resin or the like, wherein the surface plate portion 21 covers a part of the boss portion 15 and the spoke portions 16, and the peripheral plate portion 22 is a peripheral wall protruding from the rear face (back face) of the surface plate portion 21 in a cylindrical shape such as an approximately square tube when viewed from the front. A portion surrounded by the surface plate portion 21 and the peripheral plate portion 22 of the cover member 20 serves as an airbag accommodating portion for accommodating the retracted airbag, a portion facing the front side of the airbag accommodating portion serves as a front plate portion 23 as a cover body, and an emblem 24 is positioned at the center of the front plate portion 23 as an ornamental member. In addition, the surface plate portion 21 may have various configurations in terms of design. However, in the present embodiment, the surface plate portion 21 is formed to be slightly larger than the peripheral plate portion 22 approximately along the shape of the boss portion 15 when viewed from the front.

Furthermore, since the emblem 24 is also called as an ornament, the emblem 24 includes an emblem body 26 as an ornamental body formed of hard or soft synthetic resin and subject to an appropriate coating or plating process, and a back plate 27 as a mounting member formed of hard synthetic resin, for example. The front plate portion 23 of the cover member 20 is sandwiched by and fixed to the emblem body 26 and the back plate 27 (FIG. 1(b)).

Since the emblem body 26 is also called as an upper-plate, the emblem body 26 may have various shapes. However, in the present embodiment, the emblem body 26, for example, is formed in a circular shape. Furthermore, a single or plural fixing pins 31 (one fixing pin 31 in the present embodiment), which is a leg portion, and a protrusion 32 for positioning the emblem body 26 and stopping the rotation of the emblem body 26 protrude from the rear (back face) side of the emblem body 26, that is, a side facing the front plate portion 23 (FIG. 2(a) and FIG. 2(b)).

The fixing pin 31 is used to link the emblem body 26 to the back plate 27, and a tip end part of the fixing pin 31 serves as a locking portion 31a increasing a diameter in a stepped shape with respect to a proximal end side. In addition, the arrangement of the fixing pin 31 may be appropriately set in response to the shape or the like thereof if it is able to support the emblem body 26 with good balance. However, in the present embodiment, the fixing pin 31 is disposed at the center position (center) of the emblem body 26.

Furthermore, the arrangement of the protrusion 32 may be appropriately set in response to the shape of the emblem body 26. However, in the present embodiment, the protrusion 32, for example, is disposed at a position separated from the center position (center) of the emblem body 26. In addition, the protrusion 32 is not essential in the case of a shape by which the up, down, right, left or the like of the emblem body 26 are decided, for example, when the emblem body 26 has a vertically-laterally asymmetric shape.

Furthermore, the back plate 27 may have various shapes if it is able to fix the emblem body 26 to the front plate portion 23. For example, the back plate 27 is formed in a horizontally long rectangular flat plate shape in which both sides of the back plate 27 are curved in an arc shape and protrude. Furthermore, the back plate 27 is formed with through holes 33, which are lock receiving portions into which the fixing pins 31 of the emblem body 26 are fitted and locked, and the number of through holes 33 corresponding to the number of fixing pins 31.

Furthermore, the front plate portion 23 is formed with a tear line 35 facing the airbag accommodating portion (FIG. 3), and is provided with a plurality of door portions 36 at the time of expansion of the airbag by cleaving of the tear line 35. The door portions 36 include four, that is, first to fourth door portions 41, 42, 43, and 44 that are laterally asymmetric, wherein the first door portion 41, in which the emblem body 26 is disposed, is larger than the other three door portions 42, 43, and 44, and is disposed at a lower side of one side (the right side of FIG. 3).

Furthermore, since the tear line 35 forming the door portions 36 is also called as a scheduled line portion or a breaking scheduled portion, the rear (back face) side of the front plate portion 23 is recessed in a groove shape and is formed as a weak portion more fragile than other portions of the front plate portion 23. The tear line 35 may be arbitrarily set in response to the shape and the number of door portions 36 to be set. For example, in the present embodiment, the tear line 35 includes bilateral outer peripheral tear line portions 51 and 51, a lower outer peripheral tear line portion 52, a bypass tear line portion 54 having a semi-arc shape, a direct connection tear line portion 55, a first connection tear line portion 56, a second connection tear line portion 57, and a third connection tear line portion 58. The bilateral outer peripheral tear line portions 51 and 51 are formed at both sides along the outer peripheral portion of the front plate portion 23 and the lower outer peripheral tear line portion 52 are formed at a lower side along the outer peripheral portion of the front plate portion 23. The bypass tear line portion 54 is formed along the other side (the left side in FIG. 3) of the emblem 24. The direct connection tear line portion 55 smoothly extends from the upper end part of the bypass tear line portion 54 without having a corner and extends linearly to one outer peripheral tear line portion 51 as a tangent in contact with an outer edge of the emblem 24 or a line parallel to the tangent. The first connection tear line portion 56 is bent in a smooth curved line shape from the lower end part of the bypass tear line portion 54 and further extends linearly to the lower outer peripheral tear line portion 52. The second connection tear line portion 57 extends linearly from the other side, which is an intermediate position of the bypass tear line portion 54, to the other outer peripheral tear line portion 51. The third connection tear line portion 58 extends linearly from an upper side, which is the intermediate position of the bypass tear line portion 54, to the upper end part of the outer peripheral portion of the front plate portion 23.

The bypass tear line portion 54 is formed in an arc shape slightly longer than a semicircle, and the direct connection tear line portion 55 is inclined toward a lower portion of one side thereof.

Moreover, a portion between the outer peripheral tear line portions 51, 51 and 52, which are adjacent to one another, is a hinge portion 61 serving as a rotating axis when the door portions 36 are expanded to the front side. That is, a portion having no tear line 35 of the outer peripheral portion of the front plate portion 23 allows expanded door portions 36 to be aligned adjacent to the outer peripheral portions of the peripheral plate portion 22 and the surface plate portion 21 which are non-expansion portions. Moreover, the hinge portion 61 (a hinge portion 61a) aligned adjacent to the first door portion 41, for example, is formed in a straight line shape inclined with respect to a center line L1 in the right and left width direction of the front plate portion 23 along the up and down direction, and confronts the emblem 24.

Furthermore, lower terminal portions 51a of the bilateral outer peripheral tear line portions 51 and 51 and bilateral terminal portions 52a of the lower outer peripheral tear line portion 52 are curved to be folded back inward in order to prevent cleaving. Moreover, upper terminal portions 51b of the bilateral outer peripheral tear line portions 51 and 51 and an upper terminal portion 58a of the third connection tear line portion 58 are formed to reach the peripheral plate portion 22 of the cover member 20, and further a weak portion is also continuously formed in the peripheral plate portion 22 according to necessity.

Furthermore, at the surface side of the front plate portion 23, that is, at the rear face side facing an occupant, a fitting recess 64 is recessed in the first door portion 41 as a fitting portion for fitting the emblem body 26 of the emblem 24. The fitting recess 64 may have an arbitrary shape, around which the emblem body 26 may be fitted, in response to the shape of the emblem body 26. However, in the present embodiment, the fitting recess 64, for example, has a circular shape. Furthermore, a part of the periphery of the fitting recess 64 is surrounded by the bypass tear line portion 54, and for example, is positioned at approximately the center of the front plate portion 23. The fitting recess 64 is formed at center position (center) thereof with an insertion through hole 65 through which the fixing pin of the emblem body 26 is inserted. Moreover, the fitting recess 64 is formed with a fitting through hole 66, into which the protrusion 32 of the emblem body 26 is fitted, at a position separated outward from the insertion through hole 65.

Furthermore, at the rear (back face) side of the front plate portion 23, that is, at the front face side (opposite occupant-side), a protruding rib 67 is positioned at the first door portion 41 as a protruding portion that surrounds the periphery of the back plate 27 of the emblem 24. That is, the protruding rib 67 is positioned corresponding to the rear (back face) side of the fitting recess 64. The protruding rib 67 may have an arbitrary shape, which surrounds an outer side of the back plate 27, in response to the shape of the back plate 27. However, in the present embodiment, the protruding rib 67, for example, has a horizontally long rectangular shape in which both sides of the protruding rib 67 are curved in an arc shape. Accordingly, the inside of the protruding rib 67 serves as a back face-side fitting portion 68 for fitting the back plate 27, and the insertion through hole 65 is positioned at approximately the center of the back face-side fitting portion 68. In addition, the fitting through hole 66 is positioned outside of the protruding rib 67 (the back face-side fitting portion 68). From the back face-side fitting portion 68, a support portion 70 for supporting the back plate 27 protrudes with a protrusion amount smaller than that of the protruding rib 67.

In relation to the support portion 70, first support portions 71 and 72, a second support portion 73, a third support portion 74, and a fourth support portion 75 are set around the insertion through hole 65. The first to third support portions 71, 73, and 74, for example, are positioned at apexes of a virtual regular triangle T1 employing the insertion through hole 65 as a center, the first to third support portions 72, 73, and 74 are positioned at apexes of a virtual isosceles triangle T2 employing one side of the virtual regular triangle T1 as a bottom side, and the first, third, and fourth support portions 71, 74, and 75 are positioned at apexes of a virtual isosceles triangle T3 employing one side of the virtual regular triangle T1 as a bottom side. Furthermore, the first and second support portions 71 and 73 are positioned below the insertion through hole 65, and the first, third, and fourth support portions 72, 74, and 75 are positioned above the insertion through hole 65. Moreover, the first support portions 71 and 72 are positioned on a predetermined virtual straight line L2 perpendicular to or approximately perpendicular to a broken line of the hinge portion 61a, in other words, a bending portion occurring in the hinge portion 61a due to the expansion of the first door portion 41, that is, a virtual straight line for linking between (between the terminal portions of the tear line 35) the terminal portions 51a and 52a of the outer peripheral tear line portions 51 and 52 that segment both sides of the hinge portion 61a. The second support portion 73 and the third support portion 74 are positioned in line-symmetry with respect to the straight line L2. In other words, the straight line L2 is a straight line passing through the center of the virtual regular triangle T1 (the center of the insertion through hole 65), and the bottom sides of the regular triangle T1 and the isosceles triangle T2 are approximately parallel to the hinge portion 61a. Furthermore, the third support portion 74, for example, is positioned on the center line L1 in the right and left width direction of the front plate portion 23, and the first and second support portions 72 and 73 and the fourth and first support portions 75 and 71 are disposed in line-symmetry with respect to the center line L1, that is, disposed in bilateral symmetry with respect to the center line L1. Accordingly, a distance between the first and second support portions 71 and 73, a distance between the first and third support portions 71 and 74, and a distance between the second and third support portions 73 and 74 are set to be equal to one another, and a distance between the first and second support portions 72 and 73, a distance between the first and third support portions 72 and 74, a distance between the fourth and third support portions 75 and 74, and a distance between the fourth and first support portions 75 and 71 are set to be equal to one another.

Inside of each of the first to fourth support portions 71, 72, 73, 74, and 75, a thinned wall portion 77 is set as a recess, and by this thinned wall portion 77, each of the first, second, and fourth support portions 71, 72, 73, and 75 has a cylindrical shape and the third support portion 74 has a semi-cylindrical shape having a U shape, which continues to the upper portion of the protruding rib 67 when viewed from the front. Moreover, the tip end parts of the first to fourth support portions 71, 72, 73, 74, and 75 have planar shapes approximately flush with one another.

In addition, in the present embodiment, the thinned wall portion 77 is set in all of the first to fourth support portions 71, 72, 73, 74, and 75. However, the support portions may not be provided with the thinned wall portion 77 according to necessity.

When manufacturing the cover member 20, the surface plate portion 21 and the peripheral plate portion 22 including the front plate portion 23 are injection-molded by synthetic resin in advance, a separately molded emblem body 26 is fitted into the fitting recess 64 while the fixing pin 31 and the protrusion 32 are being inserted through the insertion through hole 65 and the fitting through hole 66 from the surface side of the front plate portion 23, and a separately molded back plate 27 is fitted to the back face-side fitting portion 68 at the back face side of the front plate portion 23. At this time, a tip end side including the locking portion 31a of the fixing pin 31 of the emblem body 26 protruding from the insertion through hole 65 is press-fitted into the through hole 33 of the back plate 27, so that the locking portion 31a is locked with the back face side of the back plate 27 by passing through the through hole 33, and the emblem 24 is fixed to a fixed position of the first door portion 41 of the front plate portion 23.

If an automobile provided with the steering wheel 10 including the airbag device 12 having the cover member 20 suffers from a collision or the like, a control device operates the inflator to supply gas to the airbag. Then, the airbag is rapidly inflated and expanded, the cover member 20 is broken along the tear line 35 with the inflation and expansion pressure, and the door portions 36 that consists of four, that is, the first to fourth door portions 41, 42, 43, and 44 are formed in the present embodiment. Moreover, each of the door portions 41, 42, 43, and 44 rotates about the hinge portion 61 to form a protrusive opening that is an opening through which the airbag is inflated, and the airbag is expanded in front of an occupant from the protrusive opening, thereby protecting the occupant.

When the door portions 41, 42, 43, and 44 are expanded, the first door portion 41 provided with the emblem 24 is heavier than the second to fourth door portions 42, 43, and 44 having no emblem 24, and the start of expansion behavior may be delayed. Furthermore, if the expansion starts once, the door portion has a tendency to move in the same direction due to large inertia.

In this regard, in the present embodiment, the shape of the first door portion 41 provided with the emblem 24 is allowed to be different from those of the second to fourth door portions 42, 43, and 44 having no emblem 24 and the area of the first door portion 41 provided with the emblem 24 is allowed to be larger than those of the second to fourth door portions 42, 43, and 44, so that the first door portion 41 is more largely affected by the expansion force of the airbag as compared with the other door portions 42, 43, and 44, and can be expanded with good balance similarly to the other door portions 42, 43, and 44 without delay from the other door portions 42, 43, and 44.

When the first door portion 41 is expanded, the centrifugal force is applied to the emblem 24 along the direction (the straight line L2) approximately perpendicular to the broken line of the hinge portion 61a. This centrifugal force is uniformly supported with good balance (with respect to the back plate 27) by the first support portions 71 and 72 of the support portion 70 positioned on the straight line L2 and the second and third support portions 73 and 74 positioned in line symmetry with respect to the straight line L2, so that distortion of the back plate 27 is suppressed, and a forcedly fixed state of the emblem 24 to the first door portion 41 is maintained.

As described above, according to the present embodiment, the first support portions 71 and 72, which are positioned on the predetermined straight line L2 approximately perpendicular to the broken line of the hinge portion 61a, and the second and third support portions 73 and 74, which are positioned in line symmetry with respect to the predetermined straight line L2, are set in the support portion 70 that supports the back plate 27 with respect to the back face side of the first door portion 41 of the door portion 36, so that the first support portions 71 and 72 and the second and third support portions 73 and 74 draw a regular triangle or an isosceles triangle line-symmetric with respect to the straight line L2 which is the direction of the centrifugal force applied to the emblem 24 (the back plate 27) due to the expansion of the first door portion 41 of the door portion 36. Thus, it is possible to receive the centrifugal force, which is applied to the back plate 27 due to the expansion of the first door portion 41 of the door portion 36, with good balance by the first to third support portions 71, 72, 73, and 74. Consequently, the emblem 24 can be reliably fixed to the first door portion 41 of the door portion 36 with preventing the fixing pin 31 from being excessively locked into the through hole 33 more than necessary, so that it is possible to improve locking workability of the through hole 33 and the fixing pin 31, resulting in the improvement of productivity and manufacturability.

Particularly, the first support portion 72 is disposed at the outermost side of the first door portion 41 of the door portion 36, that is, a position at which the largest centrifugal force is applied when the first door portion 41 is expanded, so that it is possible to reliably receive the centrifugal force by the first support portion 72.

Furthermore, at least one of the first to third support portions 71, 72, 73, and 74 (and the fourth support portion 75) of the support portion 70 protruding from the back face side of the first door portion 41 of the door portion 36 has a cylindrical shape having the thinned wall portion 77 therein, so that it is possible to prevent thickness at the positions of the first to third support portions 71, 72, 73, and 74 (and the fourth support portion 75) from increasing more than necessary, and when the front plate portion 23 is formed of synthetic resin, a sink mark is difficult to occur in the surface side of the door portion 36 (the first door portion 41) serving as a design surface of the front plate portion 23, resulting in the further improvement of an external appearance.

Moreover, the periphery of the back plate 27 is surrounded by the protruding rib 67 protruding from the back face side of the first door portion 41 of the door portion 36, so that the position of the back plate 27 can be restricted by the protruding rib 67, and the back plate 27, and the emblem body 26, which is linked to the back plate 27 by the fixing pin 31 and the through hole 33, can be held at the fixed position of the door portion 36 (the first door portion 41) more reliably with respect to the centrifugal force applied when the door portion 36 (the first door portion 41) is expanded.

The emblem body 26 is fitted into the fitting recess 64 recessed in the surface side of the first door portion 41 of the door portion 36, so that the position of the emblem body 26 can be restricted by the fitting recess 64, and the emblem body 26 can be held at the fixed position of the door portion 36 (the first door portion 41) more reliably with respect to the centrifugal force applied when the door portion 36 (the first door portion 41) is expanded.

In addition, even though the emblem body 26 is bulky, the emblem body 26 is able to suppress a protrusion amount from the first door portion 41 of the door portion 36 to the surface side by the fitting recess 64, and an occupant does not feel discomfort even though a hand of the occupant touched in a steering wheel operation. Furthermore, for example, when the emblem body 26 is formed with an ornamental communication hole or the like, since the surrounded inner side (the cover member 20 side) of the emblem body 26 is exposed, it is possible to easily change texture, resulting in the improvement of design.

Figure 5:
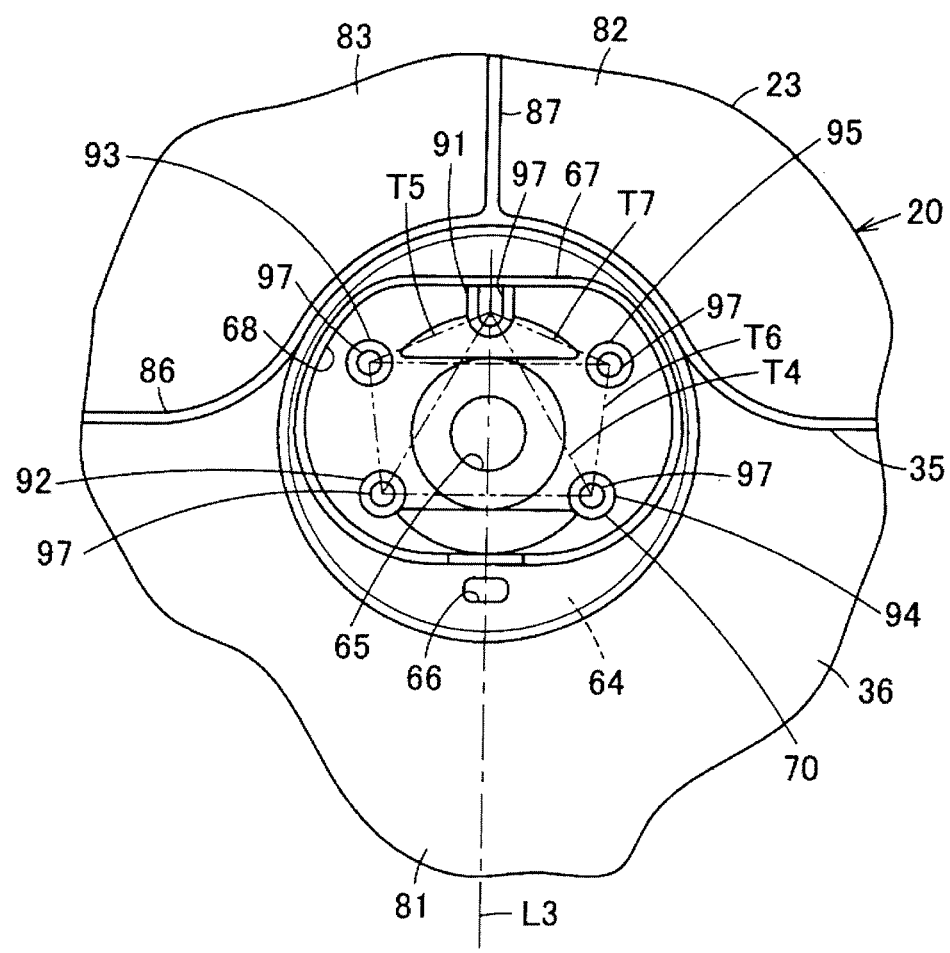
FIG. 5 is a diagram showing a back face of a part of a door portion of a cover body of a second embodiment of a cover member of an airbag device of the present invention.
Figure 6:
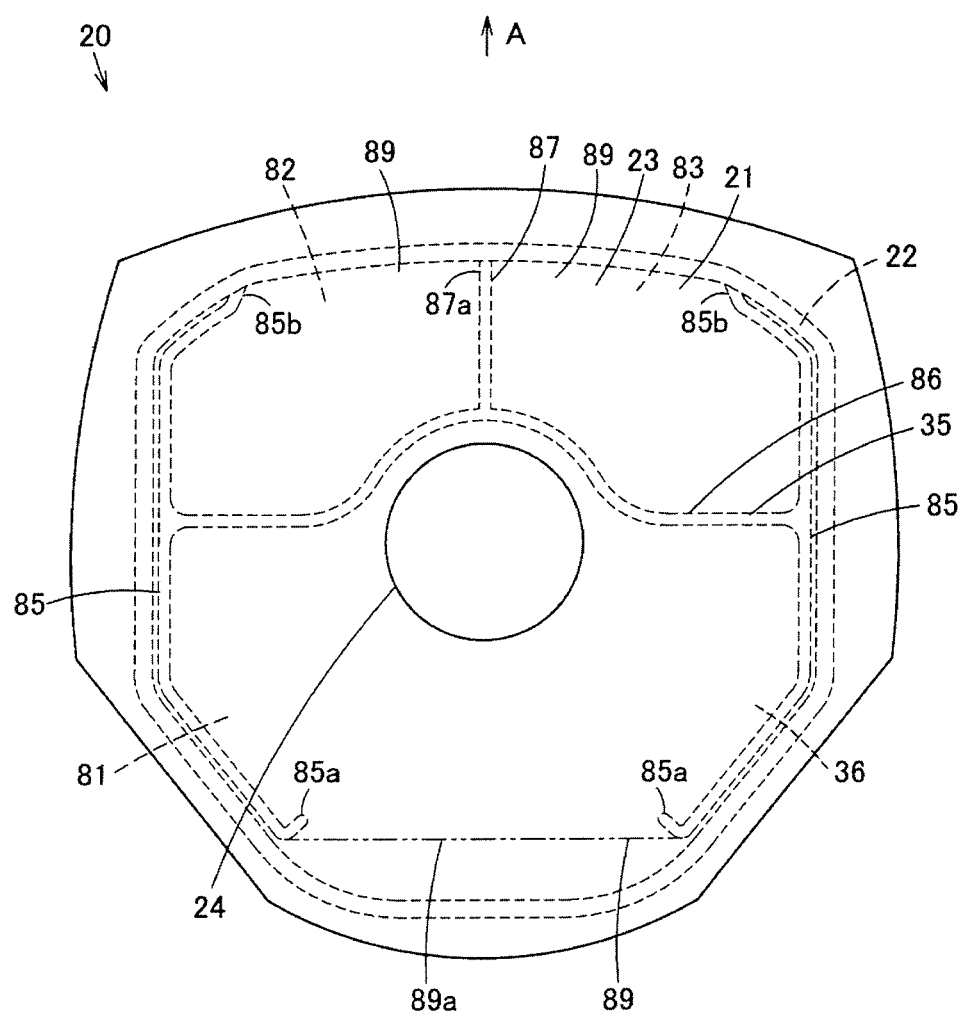
FIG. 6 is a front view showing the cover member of the second embodiment.

Next, a second embodiment will be described with reference to FIG. 5 and FIG. 6. Note that the same reference numerals are used to designate the same configurations and operations as those of the first embodiment, a description thereof will be omitted.

In relation to the cover member 20 of the present embodiment, three, that is, first to third door portions 81, 82, and 83, which are bilaterally symmetric, are set in the door portion 36 formed when an airbag is expanded by the cleaving of the tear line 35 formed in the front plate portion 23, wherein the first door portion 81, in which the emblem 24 is disposed, is larger than the other two door portions 82 and 83 and is disposed below the center. That is, in the present embodiment, the tear line 35 includes bilateral outer peripheral tear line portions 85 and 85 which are formed at both sides along the outer peripheral portion of the front plate portion 23, a bypass tear line portion 86 for linking one outer peripheral tear line portion 85 to the other outer peripheral tear line portion 85, and a connection tear line portion 87 extending linearly from an upper side, which is the intermediate position of the bypass tear line portion 86, to the upper end part of the outer peripheral portion of the front plate portion 23.

Furthermore, the bypass tear line portion 86 is curved in an arc shape to protrude upward at a position in the vicinity of the center in the right and left direction of the front plate portion 23 corresponding to the emblem 24 (the fitting recess 64 and the back face-side fitting portion 68).

Moreover, portions between the upper end parts and the lower end parts of the adjacent outer peripheral tear line portions 85 and 85 are hinge portions 89 serving as rotating axes when the door portions 36 are expanded to the front side. That is, a portion having no tear line 35 of the outer peripheral portion of the front plate portion 23 allows expanded door portions 36 to be aligned adjacent to the outer peripheral portions of the peripheral plate portion 22 and the surface plate portion 21 which are non-expansion portions. Moreover, the hinge portion 89 (a hinge portion 89a) aligned adjacent to the first door portion 81, for example, is formed in a straight line shape along the right and left direction, which is approximately perpendicular to a center line L3 (a predetermined straight line) in the right and left width direction of the front plate portion 23 along the up and down direction, and confronts the emblem 24.

Furthermore, lower terminal portions 85a of the bilateral outer peripheral tear line portions 85 and 85 are curved to be folded back inward in order to prevent cleaving. Moreover, upper terminal portions 85b of the bilateral outer peripheral tear line portions 85 and 85 and an upper terminal portion 87a of the connection tear line portion 87 are formed to reach the peripheral plate portion 22 of the cover member 20, and further a weak portion is also continuously formed in the peripheral plate portion 22 according to necessity.

Furthermore, in relation to the support portion 70 protruding from the back face-side fitting portion 68 surrounded by the protruding rib 67 positioned at the first door portion 81 at the rear (back face) side of the front plate portion 23, that is, at the front face side (opposite occupant-side), a first support portion 91, second support portions 92 and 93, and third support portions 94 and 95 are set around the insertion through hole 65. The first to third support portions 91, 92, and 94, for example, are positioned at apexes of a virtual regular triangle T4 employing the insertion through hole 65 as a center, the first and second support portions 91, 92, and 93 are positioned at apexes of a virtual isosceles triangle T5 employing one side of the virtual regular triangle T4 as a bottom side, the first and third support portions 91, 94, and 95 are positioned at apexes of a virtual isosceles triangle T6 employing one side of the virtual regular triangle T4 as a bottom side, and further the first to third support portions 91, 93, and 95 are positioned at apexes of a virtual isosceles triangle T7 having two sides having the same length as those of equal sides of the virtual isosceles triangle T5 and equal sides of the virtual isosceles triangle T6. Furthermore, the first to third support portions 91, 93, and 95 are positioned above the insertion through hole 65, and the second and third support portions 92 and 94 are positioned below the insertion through hole 65. Moreover, the first support portion 91 is positioned on the center line L3, and the second support portions 92 and 93 and the third support portions 94 and 95 are positioned in line-symmetry with respect to the center line L3. In other words, the center line L3 is a straight line passing through the center of the virtual regular triangle T4 (the center of the insertion through hole 65), and the bottom sides of the regular triangle T4 and the isosceles triangle T7 are approximately parallel to the hinge portion 89a. Accordingly, a distance between the first and second support portions 91 and 92, a distance between the first and third support portions 91 and 94, and a distance between the second and third support portions 92 and 94 are set to be equal to one another, and a distance between the first and second support portions 91 and 93, a distance between the second support portions 92 and 93, a distance between the first and third support portions 91 and 95, and a distance between the third support portions 94 and 95 are set to be equal to one another.

Inside of each of the first to third support portions 91, 92, 93, 94, and 95, a thinned wall portion 97 is set as a recess, and by this thinned wall portion 97, each of the second and third support portions 92, 93, 94 and 95 has a cylindrical shape and the first support portion 91 has a semi-cylindrical shape having a U shape, which continues to the upper portion of the protruding rib 67 when viewed from the front. Moreover, the tip end parts of the first to third support portions 91, 92, 93, 94, and 95 have planar shapes approximately flush with one another.

If an automobile provided with the steering wheel 10 including the airbag device 12 having the cover member 20 suffers from a collision or the like, a control device operates the inflator to supply gas to the airbag. Then, the airbag is rapidly inflated and expanded, the cover member 20 is broken along the tear line 35 with the inflation and expansion pressure, and the door portions 36 that consists of three, that is, the first to third door portions 81, 82, and 83 are formed in the present embodiment. Moreover, each of the door portions 81, 82, and 83 rotates about the hinge portion 89 to form a protrusive opening that is an opening through which the airbag is inflated, and the airbag is expanded in front of an occupant from the protrusive opening, thereby protecting the occupant.

When the door portions 81, 82, and 83 are expanded, the first door portion 81 provided with the emblem 24 is heavier than the second and third door portions 82 and 83 having no emblem 24, and the start of expansion behavior may be delayed. Furthermore, if the expansion starts once, the door portion has a tendency to move in the same direction due to large inertia.

In this regard, in the present embodiment, the shape of the first door portion 81 provided with the emblem 24 is allowed to be different from those of the second and third door portions 82 and 83 having no emblem 24 and the area of the first door portion 81 provided with the emblem 24 is allowed to be larger than those of the second and third door portions 82 and 83, so that the first door portion 81 is more largely affected by the expansion force of the airbag as compared with the other door portions 82 and 83, and can be expanded with good balance similarly to the other door portions 82 and 83 without delay from the other door portions 82 and 83.

When the first door portion 81 is expanded, the centrifugal force is applied to the emblem 24 in the direction (along the center line L3) perpendicular or approximately perpendicular to a broken line of the hinge portion 89a, in other words, a bending portion occurring in the hinge portion 89a due to the expansion of the first door portion 81, that is, a virtual straight line for linking between (between the terminal portions of the tear line 35) the terminal portions 85a and 85a of the outer peripheral tear line portions 85 and 85 that segment both sides of the hinge portion 89a. This centrifugal force is uniformly supported with good balance (with respect to the back plate 27) by the first support portion 91 of the support portion 70 positioned on the center line L3 and the second support portions 92 and 93 and the third support portions 94 and 95 positioned in line symmetry with respect to the center line L3, so that distortion of the back plate 27 is suppressed, and a forcedly fixed state of the emblem 24 to the first door portion 81 is maintained.

As described above, according to the present embodiment, the first support portion 91, which is positioned on the center line L3 approximately perpendicular to the broken line of the hinge portion 89a, and the second and third support portions 92, 93, 94, and 95, which are positioned in line symmetry with respect to the center line L3, are set in the support portion 70 that supports the back plate 27 with respect to the back face side of the first door portion 41 of the door portion 36, so that the first support portion 91 and the second and third support portions 92, 93, 94, and 95 draw a regular triangle or an isosceles triangle line-symmetric with respect to the center line L3 which is the direction of the centrifugal force applied to the emblem 24 (the back plate 27) due to the expansion of the first door portion 81 of the door portion 36. Thus, it is possible to receive the centrifugal force, which is applied to the back plate 27 due to the expansion of the first door portion 81 of the door portion 36, with good balance by the first to third support portions 91, 92, 93, 94 and 95. Consequently, the emblem 24 can be reliably fixed to the first door portion 81 of the door portion 36 with preventing the fixing pin 31 from being excessively locked into the through hole 33 more than necessary, so that it is possible to improve locking workability of the through hole 33 and the fixing pin 31, resulting in the improvement of productivity and manufacturability.

Particularly, the first support portion 91 is disposed at the outermost side of the first door portion 81 of the door portion 36, that is, a position at which the largest centrifugal force is applied when the first door portion 81 is expanded, so that it is possible to reliably receive the centrifugal force by the first support portion 91.

Furthermore, the first to third support portions 91, 92, 93, 94, and 95 of the support portion 70 protruding from the back face side of the first door portion 41 of the door portion 36 have a cylindrical shape having the thinned wall portion 97 therein, so that it is possible to prevent thickness at the positions of the first to third support portions 91, 92, 93, 94, and 95 from increasing more than necessary, and when the front plate portion 23 is formed of synthetic resin, a sink mark is difficult to occur in the surface side of the door portion 36 (the first door portion 81) serving as a design surface of the front plate portion 23, resulting in the further improvement of an external appearance.

In addition, in each embodiment described above, the airbag device 12, for example, may have an operation portion of a horn switch.

Furthermore, a support portion may protrude from the back plate 27 and the back face side of the first door portion 41 of the front plate portion 23 making contact with the support portion of the back plate 27 may have a planar shape.

Moreover, a fixing pin may protrude from the back plate 27 and a lock receiving portion receiving the fixing pin may be provided to the emblem body 26.

Furthermore, a plurality of fixing pins may be provided. In this case, it is sufficient if each fixing pin is provided with a first support portion, which is positioned on a predetermined straight line approximately perpendicular to a broken line of a hinge portion, and second and third support portions which are positioned in line symmetry with respect to the predetermined straight line.

Furthermore, the hinge portions 61*a* and 89*a* have a straight line shape, however, may have a substantial straight line slightly curved.

Furthermore, the shape of the cover member 20 may be arbitrarily set corresponding to the shape or the like of the steering wheel 10.

INDUSTRIAL APPLICABILITY

The present invention is applicable to a cover member of an airbag device provided to parts other than steering wheels of various movable bodies, in addition to a cover member of an airbag device used in a steering wheel of an automobile, for example.

What is claimed is:

1. A cover member of an airbag device comprising:
a cover body that covers an accommodated airbag;
a tear line that segments the cover body, and is cleaved to form a plurality of door portions when the airbag is inflated and expanded;
a plurality of hinge portions disposed along an outer edge of the cover body and allowing expansion of the plurality of door portions;
an ornamental member provided with an ornamental body positioned at a surface side of one of the plurality of door portions, a mounting member positioned at a back face side of the one door portion, separately from the ornamental body, a fixing pin protruding from one of the ornamental body and the mounting member and inserted through the one door portion, and a lock receiving portion that is provided at an other of the ornamental body and the mounting member and locks the fixing pin inserted through the one door portion to fix the ornamental body to the door portion; and
a support portion protruding from one of the mounting member and the back face side of the one door portion and supporting the mounting member with respect to the back face side of the one door portion, wherein
the support portion comprises:
a first support portion positioned on a predetermined straight line approximately perpendicular to a broken line of a respective one of the plurality of hinge portions that allows the expansion of the one door portion mounted with the ornamental member; and
second and third support portions positioned in line symmetry with respect to the predetermined straight line;
the cover body is formed of synthetic resin;
the support portion protrudes from the back face side of the one door portion; and
at least one of the first support portion, the second support portion, and the third support portion of the support portion has a cylindrical shape formed therein with a recess.

2. The cover member of an airbag device according to claim 1, comprising:
a protrusion that protrudes from the back face side of the one door portion mounted with the ornamental member and surrounds a periphery of the mounting member of the ornamental member.

3. The cover member of an airbag device according to claim 1, comprising:
a fitting portion that is recessed in the surface side of the one door portion mounted with the ornamental member and fits the ornamental body of the ornamental member.

* * * * *